United States Patent
Zhao et al.

(10) Patent No.: US 10,740,895 B2
(45) Date of Patent: Aug. 11, 2020

(54) GENERATOR-TO-CLASSIFIER FRAMEWORK FOR OBJECT CLASSIFICATION

(71) Applicant: INTERNATIONAL BUSINESS MACHINES CORPORATION, Armonk, NY (US)

(72) Inventors: Shiwan Zhao, Beijing (CN); Xiaolu Zhang, Beijing (CN); Shi Lei Zhang, Beijing (CN); Bingzhe Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/017,092

(22) Filed: Jun. 25, 2018

(65) Prior Publication Data

US 2019/0392576 A1   Dec. 26, 2019

(51) Int. Cl.
*G06T 7/00* (2017.01)
*G06N 3/04* (2006.01)
(Continued)

(52) U.S. Cl.
CPC .......... *G06T 7/0012* (2013.01); *G06K 9/6267* (2013.01); *G06N 3/0454* (2013.01);
(Continued)

(58) Field of Classification Search
CPC ........ G06T 7/0012; G06T 2207/30101; G06N 20/00; G06N 3/08; G06N 5/046; G06N 3/0454; G06K 9/6267
(Continued)

(56) References Cited

U.S. PATENT DOCUMENTS

| 8,705,833 B2 | 4/2014 | Yagi et al. |
| 2017/0154420 A1 | 6/2017 | Barnes et al. |

(Continued)

OTHER PUBLICATIONS

Kakimoto, "Automated Image Analysis of a Glomerular Injury Marker Desmin in Spontaneously Diabetic Torii Rats Treated With Losartan", Journal of Endocrinology, vol. 222, Jul. 2014, pp. 43-51.

(Continued)

*Primary Examiner* — Juan A Torres
(74) *Attorney, Agent, or Firm* — Tutunjian & Bitetto, P.C.; Joseph Petrokaitis (57) ABSTRACT

A computer implemented method, computer system and computer program product are provided for data classification. The method includes receiving original data, wherein the original data includes at least one object in a first condition. The method also includes receiving generated data from a generator based on the original data, wherein the generated data includes the at least one object in a second condition, the generator trained by training data of the first condition and training data of the second condition. The method further includes determining a classification of the at least one object with a classifier based on the original data and the generated data, the classifier trained by labeled data of the first condition and more training data of the second condition that is generated based on the labeled data by the trained generator, wherein the labeled data includes the at least one object.

20 Claims, 7 Drawing Sheets

(51) Int. Cl.
    G06N 3/08      (2006.01)
    G06N 5/04      (2006.01)
    G06K 9/62      (2006.01)
    G06N 20/00     (2019.01)
(52) U.S. Cl.
    CPC ............... *G06N 3/08* (2013.01); *G06N 5/046*
         (2013.01); *G06N 20/00* (2019.01); *G06T*
                                *2207/30101* (2013.01)
(58) Field of Classification Search
    USPC .......................................................... 382/128
    See application file for complete search history.

(56)                References Cited

U.S. PATENT DOCUMENTS

2017/0249548 A1   8/2017  Nelson et al.
2018/0336439 A1*  11/2018 Kliger .................. G06N 3/0454
2019/0042888 A1*  2/2019  Tsutsui ................. G06K 9/6257
2019/0295252 A1*  9/2019  Fuchs .................... G16H 30/40

OTHER PUBLICATIONS

Chen, "Automatic Detection of Cerebral Microbleeds via Deep Learning Based 3D Feature Representation", IEEE 12th International Symposium on Biomedical Imaging, Apr. 2015, pp. 764-767.
Cruz-Roa, "Automatic Detection of Invasive Ductal Carcinoma in Whole Slide Images with Convolutional Neural Networks", SPIE Medical Imaging, Mar. 2014, pp. 1-15.
Janowczyk, "Deep Learning for Digital Pathology Image Analysis: A Comprehensive Tutorial with Selected Use Cases", Journal of Pathology Informatics, vol. 7, Issue 29, Jul. 2016, pp. 1-37.
He, "Deep Residual Learning for Image Recognition", IEE Conference on Computer Vision and Pattern Recognition, Jun. 2016, pp. 770-778.
Esteva, "Dermatologist-Level Classification of Skin Cancer with Deep Neural Networks", Springer Nature, vol. 542, Feb. 2017, pp. 115-126.
Liu, "Detecting Cancer Metastases on Gigapixel Pathology Images", ArXiv, Mar. 2017, pp. 1-13.
Gulshan, "Development and Validation of a Deep Learning Algorithm for Detection of Diabetic Retinopathy in Retinal Fundus Photographs", JAMA Network, Nov. 2016, pp. E1-E9.
Yi, "DualGAN: Unsupervised Dual Learning for Image-to-Image Translation", IEEE International Conference on Computer Vision, Apr. 2017, pp. 1-9.
Lin, "Focal Loss for Dense Object Detection", arXiv, Feb. 2018, pp. 1-10.
Han, "Fuzzy Color Histogram and Its Use in Color Image Retrieval", IEEE Transactions on Image Processing, vol. 11, No. 8, Aug. 2002, pp. 944-952.
Goodfellow, "Generative Adversarial Nets", Advances in Neural Information Processing Systems, Dec. 2014, pp. 2672-2680.
Levin, "Global Kidney Health 2017 and Beyond: A Roadmap for Closing Gaps in Care, Research, and Policy", The Lancet, vol. 390, Issue 10105, Apr. 2017, pp. 1888-1917.
Gallego, "Glomerulus Classification and Detection Based on Convolutional Neural Networks", Journal of Imaging, vol. 4, Issue 20, Jan. 2018, pp. 1-19.
Pedraza, "Glomerulus Classification with Convolutional Neural Networks", Annual Conference on Medical Image Understanding and Analysis, Jun. 2017, pp. 839-849.
Krizhevsky, "ImageNet Classification with Deep Convolutional Neural Networks", Proceedings of the 25th International Conference on Neural Information Processing Systems, vol. 1, Dec. 2012, pp. 1097-1105.
Isola, "Image-to-Image Translation with Conditional Adversarial Networks", Conference on Computer Vision and Pattern Recognition, Jul. 2017, pp. 1-10.
Szegedy, "Inception-v4, Inception-ResNet and the Impact of Residual Connections on Learning", Proceedings of the 31st Annual AAAI Conference on Artificial Intelligence, Feb. 2017, pp. 4278-4284.
Shrivastava, "Learning from Simulated and Unsupervised Images Through Adversarial Training", IEEE Conference on Computer Vision and Pattern Recognition, Jul. 2017, pp. 1-16.
Kim, "Learning to Discover Cross-Domain Relations with Generative Adversarial Networks", Proceedings of the 34th International Conference on Machine Learning, Mar. 2017, pp. 1857-1865.
Chen, "Mitosis Detection in Breast Cancer Histology Images via Deep Cascaded Networks", Proceedings of the 30th AAAI Conference on Artificial Intelligence, Feb. 2016, pp. 1160-1166.
Shaban, "StainGAN: Stain Style Transfer for Digital Histological Images", ArXiv, Apr. 2018, pp. 1-8.
Brodersen, "The Balanced Accuracy and Its Posterior Distribution", International Conference on Pattern Recognition, Aug. 2010, pp. 3121-3124.
Ronneberger, "U-Net: Convolutional Networks for Biomedical Image Segmentation", ArXiv, May 2015, pp. 1-8.
Zhu, "Unpaired Image-to-Image Translation Using Cycle-Consistent Adversarial Networks", ArXiv, Feb. 2018, pp. 1-20.
Liu, "Unsupervised Image-to-Image Translation Networks", 31st Conference on Neural Information Processing Systems, Dec. 2017, pp. 1-9.
Simonyan, "Very Deep Convolutional Networks for Large Scale Image Recognition", ICLR, Apr. 2015, pp. 1-14.
Fogo, "Fundamentals of Renal Pathology" Springer Science & Business Media. Apr. 3, 2007, One page Abstract only.

* cited by examiner

|  | s | noa | Average |
|---|---|---|---|
| PAS_ONLY | 90.76 | 90.73 | 90.74 |
| PAS_H&E | 92.74 | 92.36 | 92.55 |
| PAS_MASSON | 92.39 | 91.72 | 92.06 |
| PAS_PASM | 93.09 | 91.83 | 92.46 |
| PAS_ALL | 93.68 | 92.99 | 93.34 |

FIG. 7

GENERATOR-TO-CLASSIFIER FRAMEWORK FOR OBJECT CLASSIFICATION

BACKGROUND

Technical Field

The present invention relates to data processing, and more specifically, to object classification by a generator-to-classifier framework.

Description of the Related Art

One problem in Big Data and Artificial Intelligence (AI) era is to determine the classification of an object within a complex background. Self-driving cars, for example, need to determine correctly the classification of moving objects (e.g. human being, car) appeared in different backgrounds. It is often challenging as even in a same place, backgrounds may change with seasons, or different time of the day, etc.

In medical analysis field, staining is used to highlight important features of a soft tissue. For instance, more than 10% people all over the world suffer from nephropathy. An important way of diagnosis lies in a quantitative analysis of glomeruli, e.g., discriminating between normal and abnormal samples, and further diagnosing the abnormality if necessary. In clinics, pathologists generally refer to multiple slides of the same glomerulus, generated by different staining methods, in order to collect cues from particular glomerular structures, elements, or even microorganisms to detect subtle differences among these subcategories.

SUMMARY

This Summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present invention, there is provided computer-implemented method. The method includes receiving original data, wherein the original data includes at least one object in a first condition. The method also includes receiving generated data from a generator based on the original data, wherein the generated data includes the at least one object in a second condition, the generator trained by training data of the first condition and training data of the second condition. The method further includes determining a classification of the at least one object with a classifier based on the original data and the generated data, the classifier trained by labeled data of the first condition and more training data of the second condition that is generated based on the labeled data by the trained generator, wherein the labeled data includes the at least one object.

According to another embodiment of the present invention, there is provided a computer system, the computer system comprises a processor and a computer-readable memory coupled to the processor. The memory comprises instructions that when executed by the processor perform a method. The method includes receiving original data, wherein the original data includes at least one object in a first condition. The method also includes receiving generated data from a generator based on the original data, wherein the generated data includes the at least one object in a second condition, the generator trained by training data of the first condition and training data of the second condition. The method further includes determining a classification of the at least one object with a classifier based on the original data and the generated data, the classifier trained by labeled data of the first condition and more training data of the second condition that is generated based on the labeled data by the trained generator, wherein the labeled data includes the at least one object.

According to another embodiment of the present invention, there is provided a computer program product. The computer program product comprises a computer readable storage medium having program instructions embodied therewith, the program instructions executable by a processor to cause the processor to perform a method. The method includes receiving original data, wherein the original data includes at least one object in a first condition. The method also includes receiving generated data from a generator based on the original data, wherein the generated data includes the at least one object in a second condition, the generator trained by training data of the first condition and training data of the second condition. The method further includes determining a classification of the at least one object with a classifier based on the original data and the generated data, the classifier trained by labeled data of the first condition and more training data of the second condition that is generated based on the labeled data by the trained generator, wherein the labeled data includes the at least one object.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
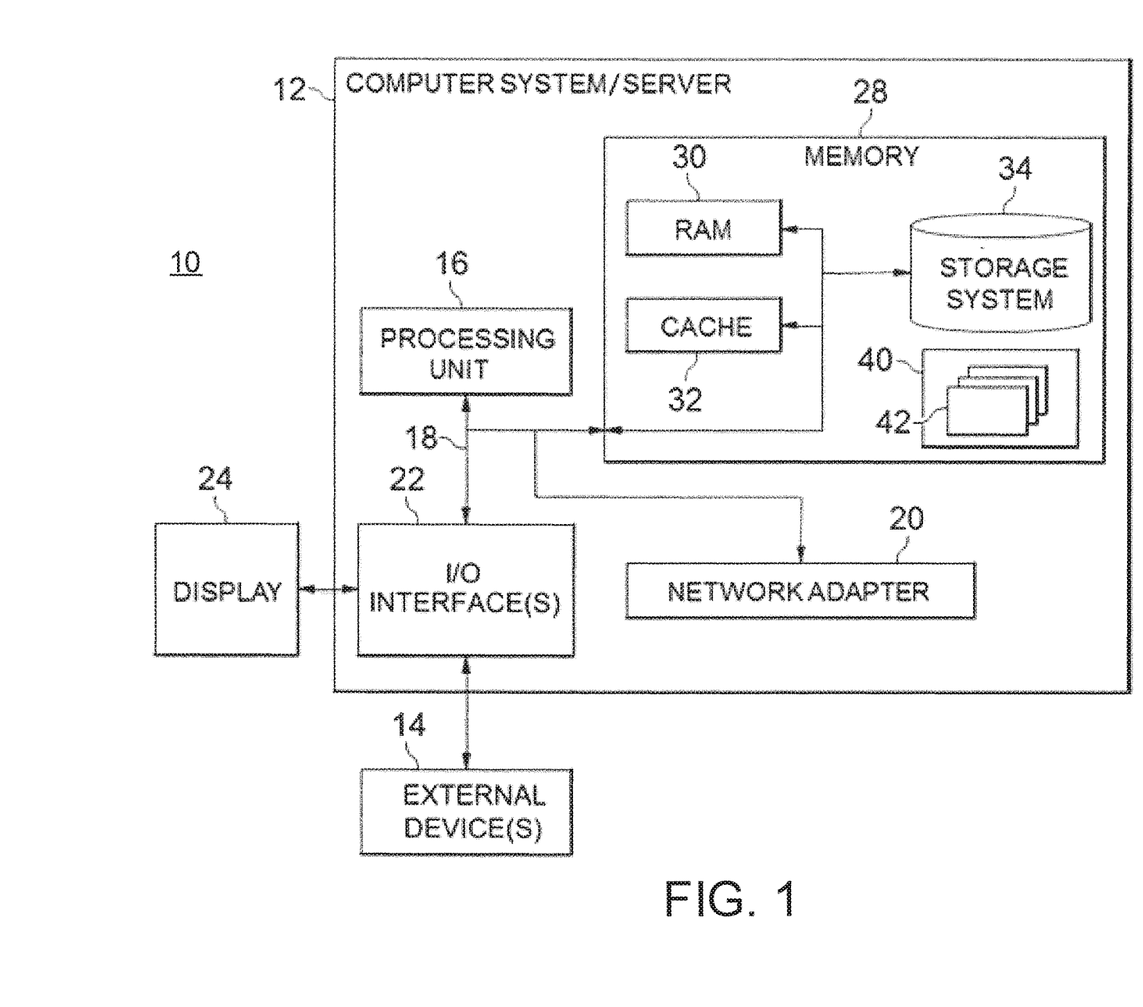
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
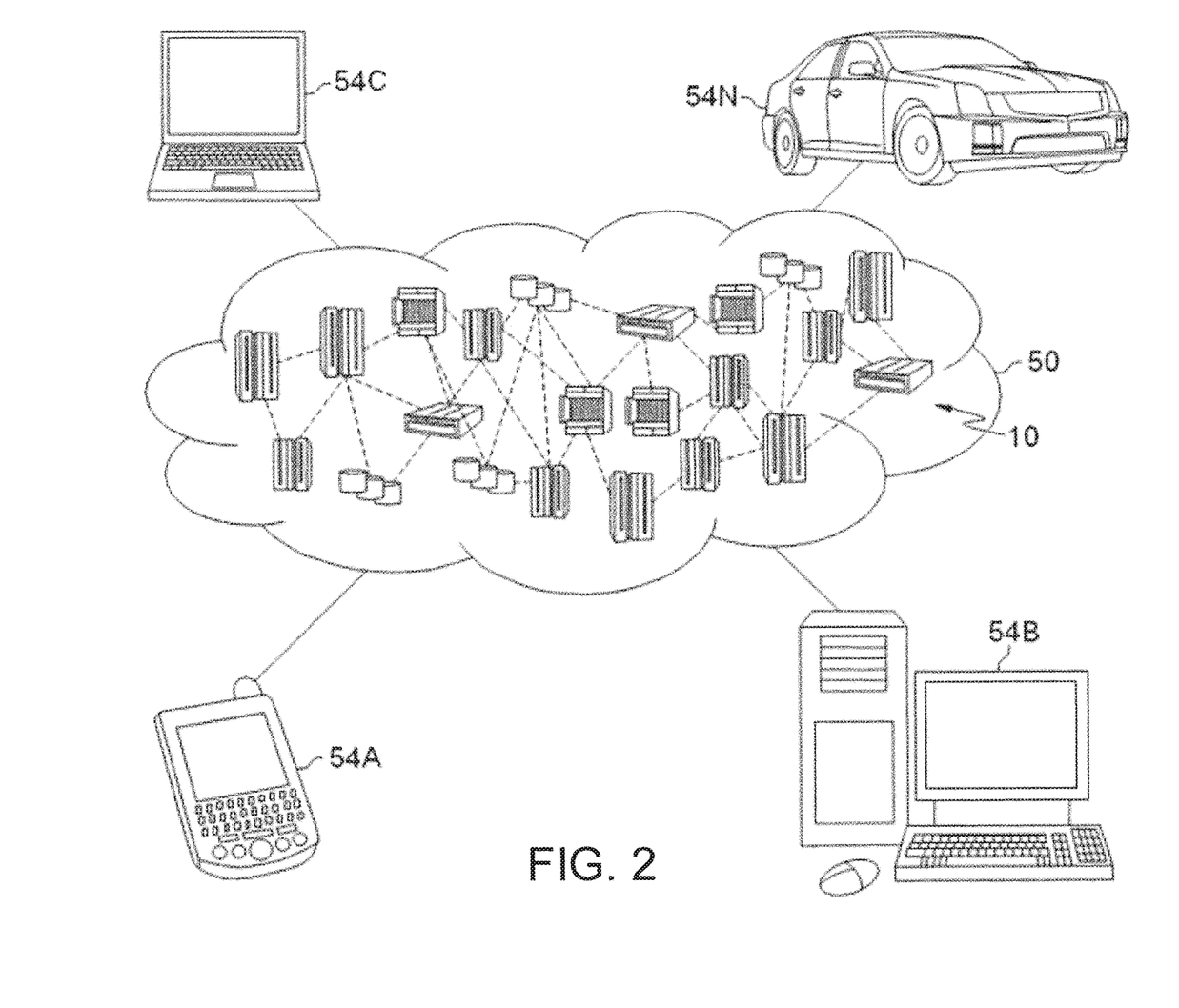
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
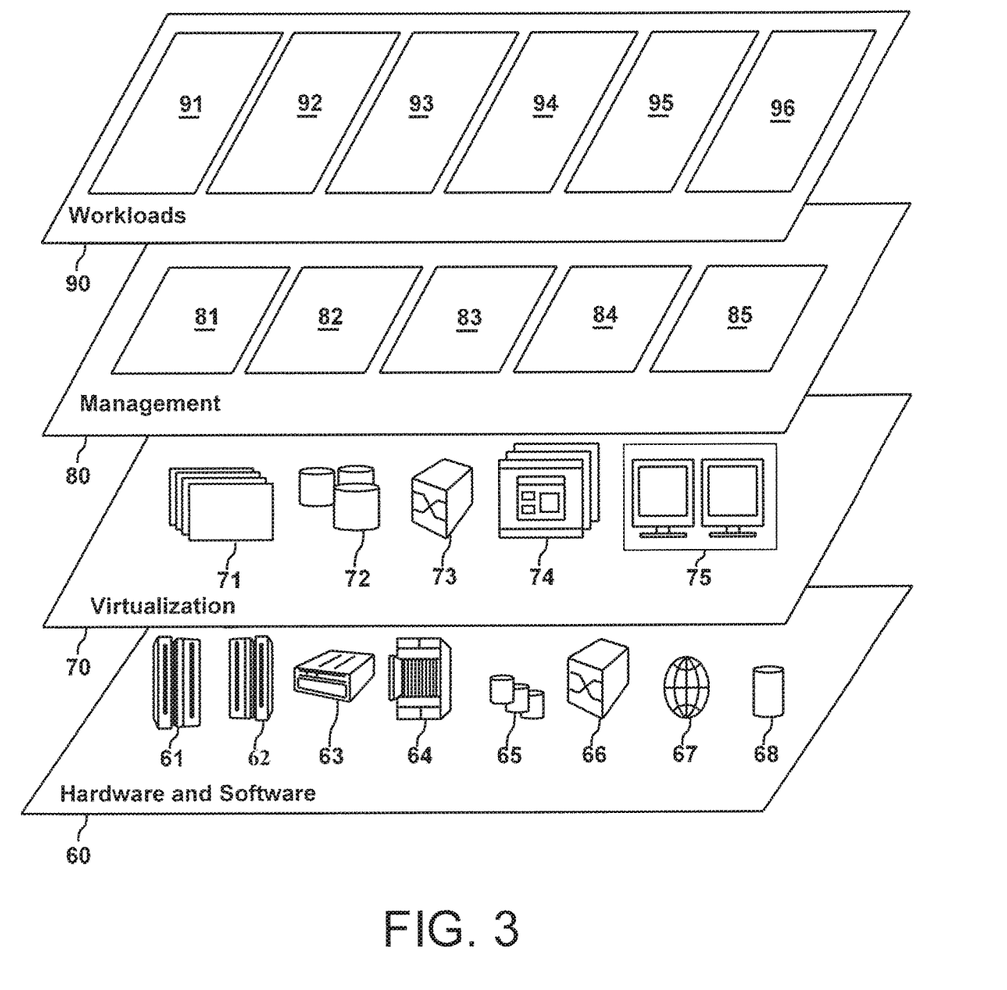
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and object classification 96 based on a generator-to-classifier framework.

Figure 4:
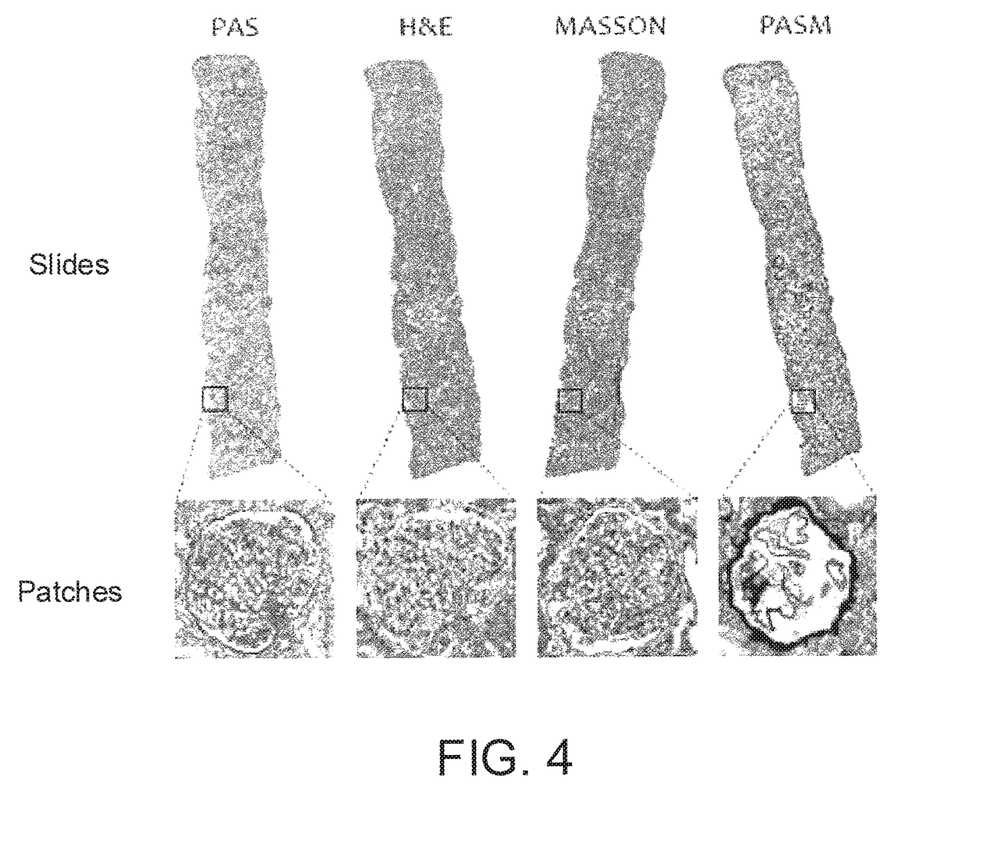
FIG. 4 shows four different slides from different staining methods.

The top of FIG. 4 shows slides from four different staining methods (periodic acid-Schiff (PAS), hematoxylin and eosin (H&E), Masson trichrome (MASSON) and periodic acid silver methenamine (PASM)), and the bottom shows four patches from the same position of these slides, containing the same glomerulus. How to classify the normal or abnormal glomeruli from the different staining background is a problem. Classifying the normal or abnormal glomeruli from the different staining background is only for a better understanding of the present invention thus will not adversely limit the scope of the invention. For example, a person skilled in the art could leverage the methods/systems of this invention in any other proper field to solve the problem of object classification, such as self-driving field etc.

Figure 5:
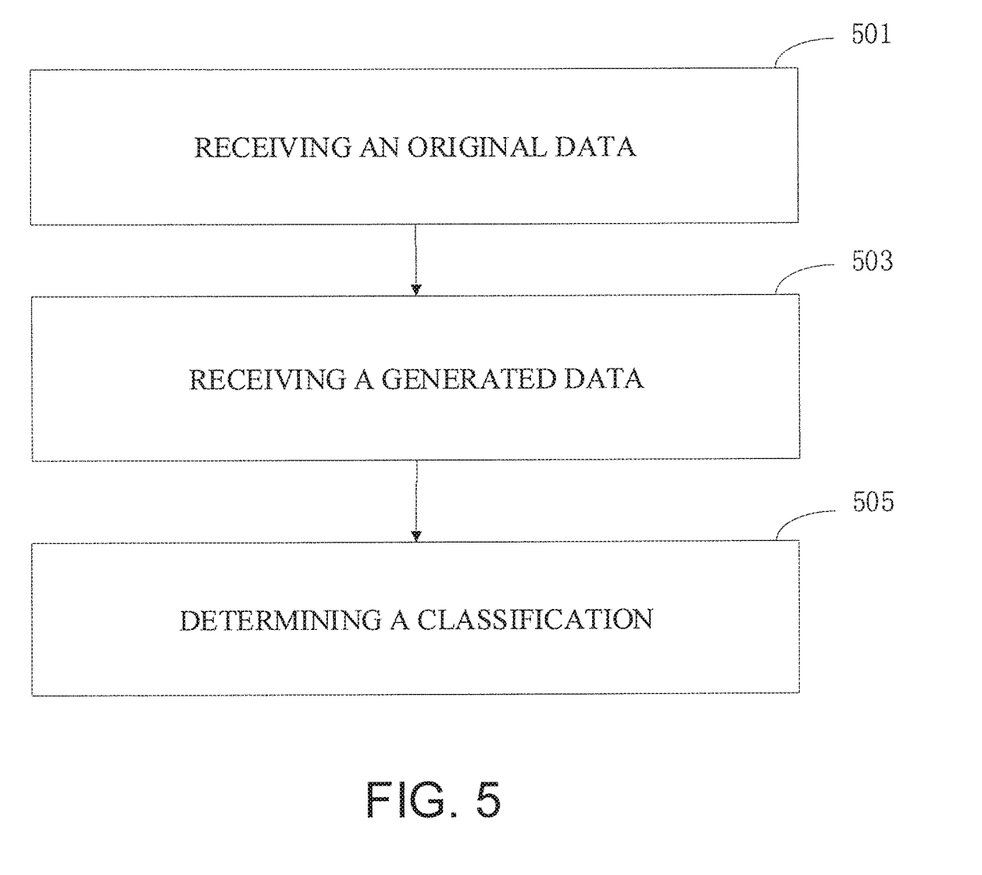
FIG. 5 shows a method of object classification according to an embodiment of the present invention.

Now referring to FIG. 5, FIG. 5 shows a method of object classification according to one embodiment of the present invention. To a better understanding of the present invention, it will be described in the following with reference to FIG. 6 which depicts a Generator-to-Classifier framework 600 according to an embodiment of the present invention. With the framework 600, the object classification processes of applying the generator(s) 603 and the classifier 605 based on medical image analysis is further described. Although medical image analysis and the framework 600 are used to explain the object classification processes, it should be clear to a person skilled in the art that the following description is merely for the purpose of simplified illustration and will not adversely limit the scope of the invention.

Now referring back to FIG. 5, at block 501, an original data are received, by one or more processing units, wherein the original data includes at least one object in a first condition. The term 'condition' here may refer to one of different seasons, different times in a period, or different staining of a medical image. General speaking, the term 'condition' here may refer to those scenarios with background consistently changing due to various reasons. The object may be any object, and it may be a moving object or biological tissue.

Figure 6:
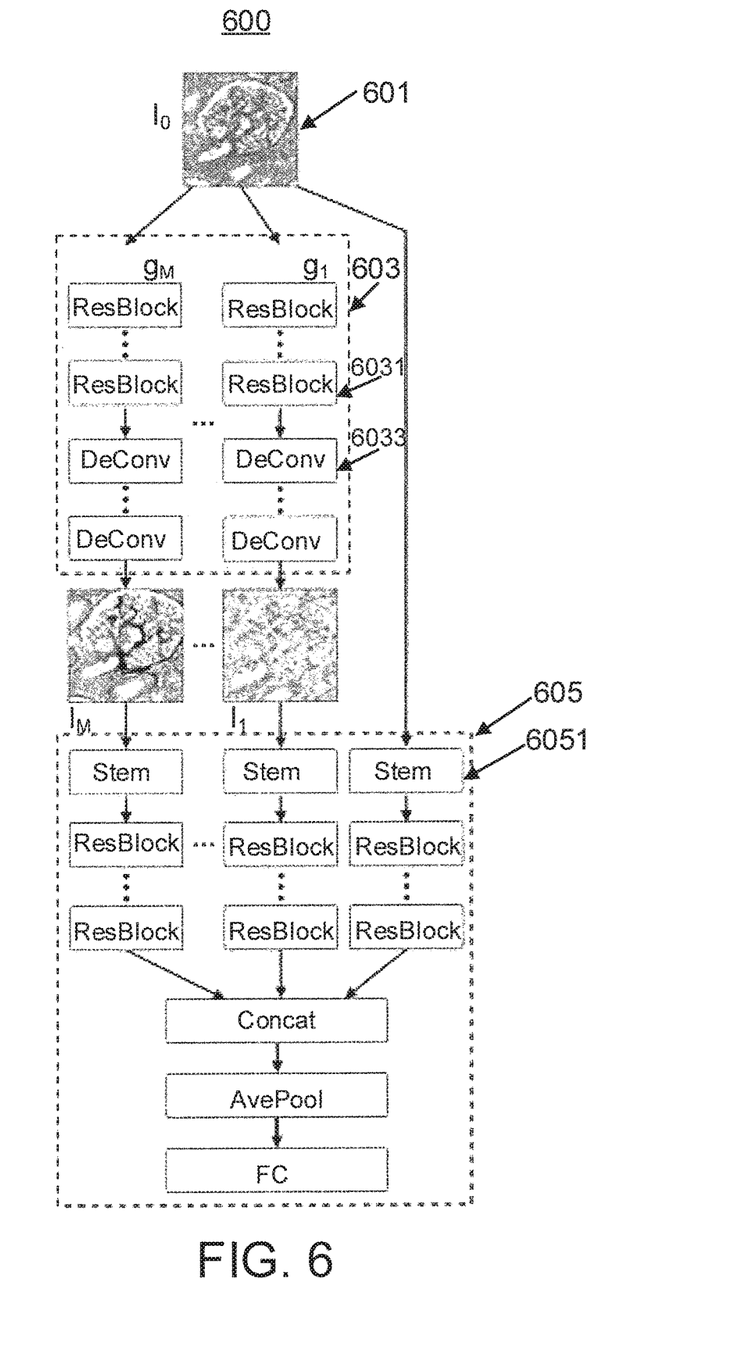
FIG. 6 shows an exemplary framework according to an embodiment of the present invention.

At block 503, a generated data from a generator 603 based on the received original data is received by one or more processing units, wherein the generated data includes the at least one object in a second condition, and the generator 603 is trained by a training data of the first condition and a training data of the second condition. The generator(s) 603 may be any type of convolutional neural networks (CNN). The original data and the training data may be medical images, or any other type of proper data. For example, training data of self-driving may be different from medical images. Also, the data in the first condition may be unpaired to the data in the second condition, wherein the term "unpaired" means the data in the first condition doesn't need to have one-to-one corresponding relationship to the data in the second condition, compared with the training data used in the traditional CNN. Also, neither the training data in the first condition nor that in the second condition need to be labeled. Additionally, the generator(s) 603 may be trained by data in the first condition, data in a second condition and data in a third condition. The third condition may be selected from: different seasons; different times in a period; or different staining, and the data in the first condition may have objects being different from the at least one object, for instance, the at least one object to be classified may be a breast cancer cell, and the objects in the training data in the first condition for the generator(s) 603 may be a glomerulus. How to train the generator(s) 603 will be explained in detail later. If the generator 603 is trained by the data in the first condition and the data in the second condition, then the generated data will be the at least one object being represented in the second condition, and so on.

At block 505, a classification of the at least one object is outputted, by one or more processing units, from a classifier based on the original data and the generated data, wherein the classifier 605 is trained by a labeled data that includes the at least one object in the first condition and a training data in the second condition generated by the trained generator(s) based on the labeled data. The original data and the generated data are inputted into a classifier, The classifier 605 may be trained by the labeled data with the object(s) in the first condition and a training data in the second condition generated based on the labeled data by the trained generator(s), which means the labeled data in the first condition may be inputted into the trained generators to obtained the data in the second condition, then the labeled data in the first condition and the generated data in the second condition will be used to train the classifier 605. The classifier 605 may be a deep residual network, or VGG, AlexNet, GoogleNet, DenseNet etc. And the classifier may be a multi-path model and extract features from the original data and the generated data for classification. How to train the classifier will be explained in detail later. The classification of the at least one object is very useful, the classification may be represented as a label(s). For instance, the classification label may show whether a glomerulus is normal or not in the medical field, or the classification label may show whether a person is following the traffic rules or not in the self-driving field, or the classification label may show whether a person is included or not in an image etc.

For a better understanding of the present invention, it will be described in the following with reference to FIG. 6. With the framework 600, the training of the generator(s) 603 and the classifier 605 based on medical image analysis is further described. Although medical image analysis and the framework 600 are used to explain the training processes, it should be clear to a person skilled in the art that the following description is merely for the purpose of simplified illustration and will not adversely limit the scope of the invention.

As mentioned above, staining could be used to highlight important features of a soft tissue. Each staining method has both advantages and disadvantages. For example, the PAS stains glomerular basement membranes, mesangial matrix and tubular basement membranes red (positive), while the PASM colors the same components black, providing a clear contrast between positively and negatively staining structures. Integrating multi-stained information is very important for pathology image analysis, e.g., for clinical purposes.

However, for glomerulus classification (e.g., to classify whether a glomerulus is normal) which typically needs a large dataset, it is difficult to label each glomerulus under all staining methods (similar problem exists in self-driving car condition) for the reasons including: (i) finding corresponding relationship among different staining methods is labor-intensive, and (ii) only a small portion of glomerulus can be clearly seen in each of the multiple staining methods. This is because each slide can be stained only once in digital pathology. Even if a set of neighboring slides containing the same glomerulus are used for various staining methods, the appearances of the glomerulus may not be identical due to the differences in slicing positions. Therefore, the goal is to get the classification of a glomerulus from single-stained inputs. To be specific, each input patch contains a glomerulus from the PAS staining. Meanwhile, a small corpus of 100 unlabeled patches from each of the other three staining methods is also provided as a reference set. It should be understood that reference set discussed above (a small corpus of 100 unlabeled patches) is merely an example, a skilled person in the art can choose any other proper reference set.

Mathematically, the single-stained glomerulus classification of this embodiment may be formulated into a joint optimization task, in which a few generators 603 ($g_1 \ldots g_m$) are first used to generate images of other staining methods $I_1 \ldots I_M$ (e.g., H&E, MASSON and PASM) from the input image 601 of PAS staining, and a classifier 605 follows is used to extract features from all these images and output the final classification. It should be pointed out that the input image 601 in PAS staining is just an example, it may be images in other kinds of staining methods.

Suppose the input image is $I_0$, which is a patch sampled from a slide with PAS staining. The goal is to design a model M:t=f($I_0$; θ), where $I_0$ is the input image, t is a class label, and θ are the model parameters, e.g., the learnable weights in the convolutional neural networks (CNN). Following the above idea, the model to be designed may be decomposed into two modules: the generator 603 and the classifier 605. The overall framework is illustrated in FIG. 6.

The Network of the Generator 603

Generator 603 (shown as the generator network 603 in FIG. 6), play a role of generating a bunch of images of different staining methods as training data from the input image $I_0$ as shown in 601. $I_0$ may be labeled or not labeled, it may include a glomerulus or not include a glomerulus. The generated images may be denoted by $I=\{I_0, I_1, \ldots, I_M\}$, in which $I_0$ is the input image, $I_1, \ldots, I_M$ are the generated images by generators ($g_1, \ldots g_m$) by using a parameterized model $I_m=g_m(I_0; \theta_m^G)$, wherein m=1, 2, ..., M, and $\theta_m^G$ is the parameter of the generator $g_m$.

Each generator ($g_1, \ldots, g_m$) consists of several down-sampling layers (residual and pooling layers) and several up-sampling layers (de-convolutional layers). The classification accuracy goes up with an increase in the number of residual blocks (ResBlock) 6031 and gradually saturates. A person skilled in the art may choose the number of residual blocks 6031 accordingly, for example, 9 residual blocks may be well enough. The de-convolution block (DeConv) 6033, also called transposed convolution block, reverts the process of a convolution.

The Network of the Classifier 605

Classifier 605 (shown as the classification network 605 in FIG. 6), extracts features from the input image as well as the generated image(s) for classification. Mathematically, it can be formulated as t=c($I_0, I_1 \ldots I_M$; $\theta^C$), wherein t is a classification label, $\theta^C$ is the parameter of the classifier. When training the classifier 605, $I_0$ is labeled and includes at least one glomerulus. The classifier is a multi-path model which consists of (M+1) sub-networks, sharing the same set of parameters $\theta^C$ to extract features from different staining images.

More specifically, the classification network 605 may be divided into two parts: the (M+1) weight-sharing back-end networks for extracting image features, and the front-end network for concatenating extracted feature vectors and making the final prediction. Each of the (M+1) back-end network is a variant of the deep residual network in which the first convolutional layer with a window size of 7×7 may be replaced by a stem block 6051, which consists of three convolution blocks followed by a 2×2 max-pooling layer, for example. The window size and the size of max-pooling layer is only for example. Experiments show that using the stem block consistently improves classification accuracy by more than 1%. The following blocks: Resblock (residual blocks), Concat (stitching multiple vectors together to form a long vector), Avepool (average pooling), FC (full connect) are operating blocks in CNN.

In overall, the whole model is the composed function of the generator and the classifier, denoted by:

$$t=f(I_0;\theta) \doteq c \circ g(I_0; \{\theta_m^G\}_{m=1}^M, \theta^C) \quad (1)$$

Note that when M=0, the model degenerates to the model using one single staining for classification.

Optimization of the generator(s) 603

The benefit of the jointly optimizing formula (1) is to enable the parameters of the generators 603 and the classifier 605 to collaborate with each other. However, the generator may be able to produce some reasonable images corresponding to other staining methods. Therefore, another embodiment is a two-stage training process, in which the networks of the generators are trained by using some unlabeled data covering different staining methods, and then fine-tuned together with the classifier to gain higher accuracy.

Initializing the Generators 603

Due to the lack of labeled (paired) data, the generators perform a task known as unpaired image-to-image translation. In an embodiment of the present invention, the Cycle-Consistent Adversarial Networks (CycleGAN) model can be leveraged. The CycleGAN model presents an approach for learning to translate an image from a source domain X to a target domain Y in the absence of paired examples. Note that when additional annotations on the target domains become available, the model can easily fit into other traditional image-to-image translation algorithms such as Pix2pix.

Each generator is initialized individually with some additional unlabeled data, for example, 100 patches may be used as the original images for each staining method. For the m-th staining method, the generator 603 is provided every time with a pair of real patches $I_0^*$ and $I_m^*$, sampled respectively from a corresponding training patch set $\mathcal{L}_0$ and a corresponding training patch set $\mathcal{L}_m$. CycleGAN introduces another type of generator, denoted by $\hat{g}_m$, to translate the generated patches in the m-th domain back to the source domain. $\hat{g}_m$ shares the same structure with gm.

There could be two goals in training unpaired translation. The first goal is to make it difficult to discriminate the generated patches from the real ones. It depends on two discriminative networks, $d_m(\bullet)$ and $\hat{d}_m(\bullet)$, which output the probability if a patch is generated by gm and $\hat{g}_m$, respectively. This leads to the adversarial loss term $\mathcal{L}_{adv}$:

$$\mathcal{L}_{adv} = \mathbb{E}_{I_m^* \sim \mathcal{L}_m}[\log(d_m(I_m^*))] + \mathbb{E}_{I_0^* \sim \mathcal{L}_0}[\log(1-d_m(g_m(I_0^*)))] + \mathbb{E}_{I_0^* \sim \mathcal{L}_0}[\log(\hat{d}_m(I_0^*))] + \mathbb{E}_{I_m^* \sim \mathcal{L}_m}[\log(1-\hat{d}_m(\hat{g}_m(I_m^*)))] \quad (2)$$

The second goal is to force the composed functions $g_m \circ \hat{g}_m(\bullet)$ and $\hat{g}_m \circ g_m(\bullet)$ to be roughly identical mappings. Therefore, this leads the cycle-consistency loss term $\mathcal{L}_{cycle}$:

$$\mathcal{L}_{cycle} = \mathbb{E}_{I_0^* \sim \mathcal{L}_0} \|\hat{g}_m \circ g_m(I_0^*) - I_0^*\|_p + \mathbb{E}_{I_m^* \sim \mathcal{L}_m} \|g_m \circ \hat{g}_m(I_m^*) - I_m^*\|_p \quad (3)$$

For example, p=1, i.e., using the Frobenius norm in measuring the difference between two patches. The overall loss is a weighted sum of $\mathcal{L}_{adv}$ and $\mathcal{L}_{cycle}$:

$$\mathcal{L} = \mathcal{L}_{adv} + \lambda \cdot \mathcal{L}_{cycle} \quad (4)$$

wherein λ is the tradeoff parameter, for example, it may be set to be 10. The Adam optimizer is used. The learning rate is fixed to be 0.0002 for the first 100 epochs, and linearly decayed to the rate of 0 in the next 100 epochs, for example.

Fine-tuning Generators 603 with the Classifier 605

After initiating the generators 603, the classifier 605 is trained together with the generators 603 in a fully-supervised manner (each glomerulus is assigned a class label). The unlabeled data from other staining methods are not used in this stage, and all the generators $\hat{g}_m$, m=1, . . . , M, are discarded, as there is no need to perform reverse-translation anymore, only the generators gm trained are maintained for further usage.

In network training, for example, Stochastic Gradient Descent, is used with a momentum of 0.5. A total of 30 epochs are performed, the learning rate is set to be 0.01 at the beginning, and divided by 10 after every 5 epochs, and only in the first 5 epochs, all parameters in the generators are frozen in order to initialize the classifier with fixed generated samples, so as to improve the stability in training. Note that the frozen of the generators in all 30 epochs will lead to the training of the generators and the classifier individually. According to the experiments, that joint optimization may lead to significant accuracy gain compared with traditional models. The number of epochs and the learning rate mentioned above are examples, it is only for a better understanding of the present invention thus will not adversely limit the scope of the invention.

The training of the generators and classifier has been discussed in the above in detail. The algorithm works very well. The key contribution naturally comes from the ability of simulating different staining methods, and enables jointly optimization so that the classifier takes advantage of complementary information.

Moreover, the algorithm provides a guided way to extract high-quality features. Note that in training a glomerulus classifier, most of the time the amount of data is often very limited. When a powerful classifier, say a very deep neural network, is used, the training data can be explained in a lot of different ways, but most of them do not learn from human knowledge, and thus do not fit the testing data very well. The algorithm provided by embodiments of the present invention, however, forces the model to rely a great deal on multi-stained data by introducing the knowledge from human doctors that other staining methods are helpful to classification. It's believed that this algorithm endures fewer risks especially in the condition of limited data.

Exemplary Results of an Embodiment

Figure 7:
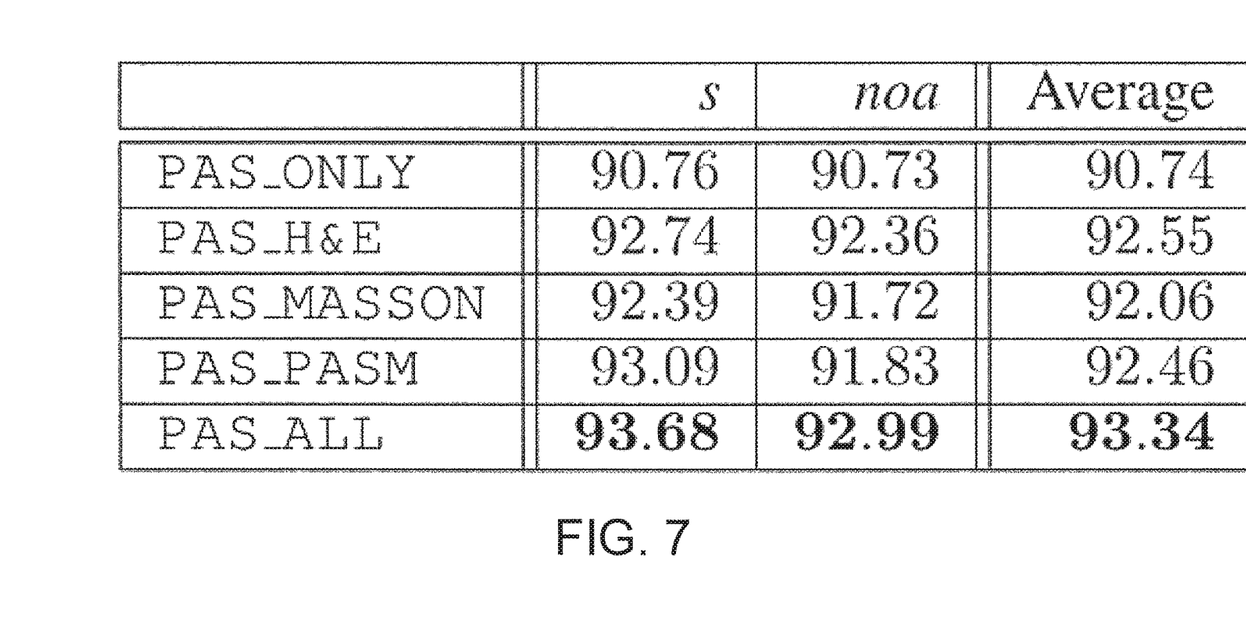
FIG. 7 shows the exemplary result of an embodiment of this disclosure.

The classification accuracy is evaluated in discriminating abnormal glomeruli (denoted by s) from normal ones (denoted by noa). The Results are summarized in the Table of FIG. 7. It can be observed that the introduction of additional stain(s) consistently improves accuracy of classification. For example, based on the PAS stain, adding H&E produces a higher classification rate in the normal (noa) category, while MASSON works better in finding abnormal (s) glomeruli. This suggests that different stains provide complementary information to assist the diagnosis, and verify the motivation of the present invention. Therefore, combining all other stains obtains consistent accuracy gain compared with other traditional methods. In particular, the PAS ALL(PAS, H&E, MASSON and PASM) model outperforms the PAS ONLY model by 2.60% in the averaged accuracy, or a 28.08% relative drop in classification error.

Transferring the Generators to Breast Cancer Classification

According to another embodiment of the present invention, in which a publicly available dataset for invasive ductal carcinoma (IDC) classification is applied, the dataset contains 277,524 patches of 50×50 pixels (198,738 IDC-negative and 78,786 IDC-positive, of PAS staining). As all patches in this dataset are PAS-stained, the training of new generators is not needed from scratch, it can be accomplished by simply reusing the pre-trained generators discussed above, and fine-tuning them together with a new classifier (used for classifying breast cell, the classifier is trained based on the data of breast cell rather than the data of glomerulus). Experiment results show the classification accuracy can reach 87.54%, which is much better than other traditional methods. That is to say, the generators trained with glomerulus images can be reused for the medical analysis of breast cancer.

In a word, the effectiveness of the training strategy discussed above may extend the utilization scope of it. First, initializing generators with a few reference sets (this only needs to be done once). When other datasets are available, the generators may be fine-tuned together with new classifiers for other datasets. It is very useful in medical analysis as the training of generators only need to be done once and may be reused.

It should be pointed out that in the above embodiments of the present invention are described with glomerulus data, however, it is only for a better understanding of the present invention thus will not adversely limit the scope of the invention. For example, a person skilled in the art could leverage the algorithms of this invention to any proper field, such as self-driving field etc., it will not be discussed in detail for the purpose of simplified illustration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter condition, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by one or more processing units, original data, wherein the original data includes at least one object in a first condition;
    receiving, by one or more processing units, generated data from a generator based on the original data, wherein the generated data includes the at least one object in a second condition, the generator trained by training data of the first condition and training data of the second condition; and
    determining, by one or more processing units, a classification of the at least one object with a classifier based on the original data and the generated data, the classifier trained by labeled data of the first condition and more training data of the second condition that is generated based on the labeled data by the trained generator, wherein the labeled data includes the at least one object.

2. The method of claim 1, wherein the at least one generator is a convolutional neural network (CNN) and the classifier is a deep residual network.

3. The method of claim 1, wherein the first condition and the second condition are selected from the group consisting of different seasons, different times in a period, and different staining.

4. The method of claim 1, wherein the original data is an image and the at least one object is selected from the group consisting of a moving object and a biological tissue.

5. The method of claim 1, wherein the first condition is different from the second condition, the training data of the first condition is unpaired to the training data of the second condition, and neither of the data of the first condition nor the data of the second condition is labeled.

6. The method of claim 1, wherein the classifier employs a multi-path model and extracts features from the original data and the generated data for classification.

7. The method of claim 1, wherein the at least one object is a glomerulus, and the first and second conditions are selected from the group consisting of periodic acid-Schiff staining, hematoxylin and eosin staining, Masson trichrome staining, and periodic acid silver methenamine staining.

8. The method of claim 1, wherein the at least one generator is fine-tuned together with the classifier.

9. The method of claim 1, wherein the at least one generator is further trained by training data of a third condition.

10. The method of claim 1, wherein the training data of the first condition includes objects different from the at least one object.

11. The method of claim 5, wherein the the classifier employs a multi-path model and extracts features from the original data and the generated data for classification.

12. A computer system, comprising:
a processor;
a non-transitory computer-readable memory coupled to the processor, the non-transitory computer-readable memory comprising instructions that when executed by the processor perform actions of:
receiving, by one or more processing units, original data, wherein the original data includes at least one object in a first condition;
receiving, by one or more processing units, generated data from a generator based on the original data, wherein the generated data includes the at least one object in a second condition, the generator trained by training data of the first condition and training data of the second condition; and
determining, by one or more processing units, a classification of the at least one object with a classifier based on the original data and the generated data, the classifier trained by labeled data of the first condition and more training data of the second condition that is generated based on the labeled data by the trained generator, wherein the labeled data includes the at least one object.

13. The system of claim 12, wherein the first condition and the second condition are selected from the group consisting of different seasons, different times in a period, and different staining.

14. The system of claim 12, wherein the original data is an image, and the at least one object is selected from the group consisting of a moving object and a biological tissue.

15. The system of claim 12, wherein the training data of the first condition includes objects different from the at least one object.

16. The system of claim 13, wherein the at least one object is a glomerulus, and the first and second condition are selected from the group consisting of periodic acid-Schiff staining, hematoxylin and eosin staining, Masson trichrome staining, and periodic acid silver methenamine staining.

17. A computer program product, comprising a non-transitory a computer readable storage medium having program instructions embodied therewith, the program instructions executable by a processor to cause the processor to:
receive, by one or more processing units, original data, wherein the original data includes at least one object in a first condition;
receive, by one or more processing units, generated data from a generator based on the original data, wherein the generated data includes the at least one object in a second condition, the generator trained by training data of the first condition and training data of the second condition; and
determinine, by one or more processing units, a classification of the at least one object with a classifier based on the original data and the generated data, the classifier trained by labeled data of the first condition and more training data of the second condition that is generated based on the labeled data by the trained generator, wherein the labeled data includes the at least one object.

18. The computer program product of claim 17, wherein the first condition and the second condition are selected from the group consisting of different seasons, different times in a period, and different staining.

19. The computer program product of claim 17, wherein the training data of the first condition includes objects different from the at least one object.

20. The computer program product of claim 18, wherein the at least one object is a glomerulus, and the first and second conditions are selected from the group consisting of a periodic acid-Schiff staining, hematoxylin and eosin staining, Masson trichrome staining, and periodic acid silver methenamine staining.

* * * * *